Patented Apr. 23, 1935

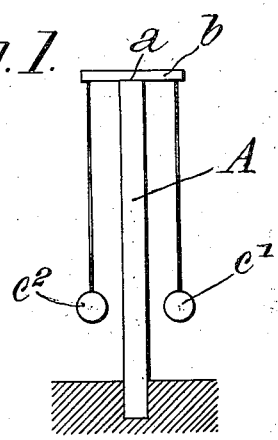
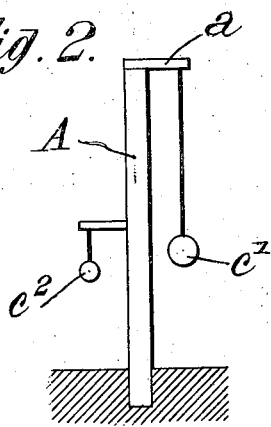
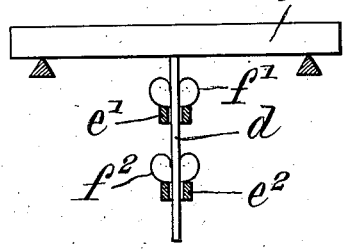
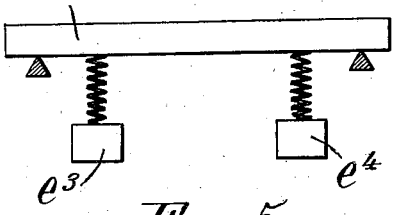
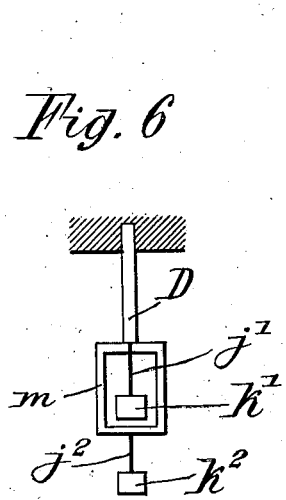
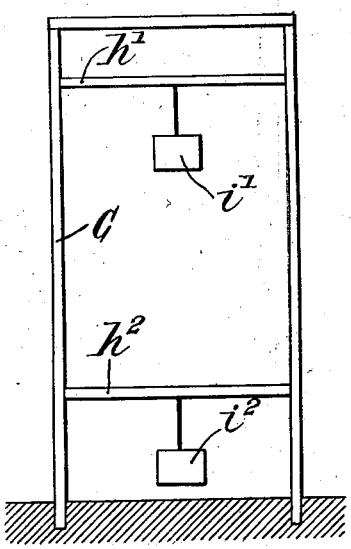

1,998,727

UNITED STATES PATENT OFFICE 1,998,727

METHOD FOR MEASURING THE RIGIDITY AND FATIGUE OF STRUCTURES

Paul Marcel Le Rolland, Nantes, France

Application December 28, 1931, Serial No. 583,415
In Belgium December 31, 1930

4 Claims. (Cl. 73—51)

The present invention relates to methods for measuring the rigidity or the fatigue of any structure such as a pole, beam, bridge, aeroplane or the like composed either of one single element or of a number of elements riveted, bolted, welded or otherwise joined together.

Up to the present time, the only methods for measuring the rigidity of structures consisted either (1) in applying formulae establishing relations between deformation and elastic stresses or exterior forces, or (2) the so-called photo-elastic method, in which, a comparison is made between a test element whose interior stresses may be observed or measured and the structure to be tested. The first of these methods yields practical results only in the case where the structure being studied is homogeneous but becomes entirely inapplicable where composite or heterogeneous structures are to be studied because of a number of non-determinable factors introduced thereby. The photo-elastic method is, obviously, a more elegant one, since it permits direct observation. However, in actual practice, it is very difficult to subject the test element to exactly the same stresses as the structure being studied unless the test element be incorporated in the structure itself, in which latter case, there is danger of seriously diminishing the strength of the latter. A third method has been proposed for directly determining the rigidity of structures and consists in subjecting the structure under test to an exterior force of known value (static), the deflection of the structure under test being used as a measure of its rigidity. While this method may be applied to certain poles, bridges and the like situated so that a stress may be exerted thereon by bearing against some exterior point which is relatively rigidly fixed, the deflections are relatively small and the structure to be tested is generally of such size or form or is so positioned that no such suitable external point can be found.

One of the objects of the present invention is to provide a method having all of the advantages and none of the disadvantages of the hereinabove described methods.

Another object is to provide a method in which a pair of oscillating or vibrating systems such as gravity or elastic pendulums (flexion or torsion), diapasons, or similar vibrating bodies positioned in or adjacent to a plane in which a stress is being applied are used for exploring the rigidity or the fatigue of the structure under test.

Still further objects will appear in the course of the detailed description now to be given with reference to the accompanying drawing, in which:

Fig. 1 illustrates, in partial section, one possible embodiment of the invention utilizing gravity pendulums;

Fig. 2 represents a second method and apparatus utilizing the pendulum principle;

Fig. 3 is a section showing a pair of elastic pendulums applied to a beam for measuring the rigidity or the fatigue of the latter, the beam being supported at two fixed points;

Fig. 4 shows another method of exploring a beam utilizing a different form of elastic pendulum than that shown in Fig. 3;

Fig. 5 represents diagrammatically a pair of gravity pendulums applied to a frame for measuring the rigidity or fatigue thereof; and Fig. 6 shows a pair of torsion pendulums utilized for measuring the rigidity of a structure subjected to torsional stresses.

The general principle upon which the invention is based is the following: when one of two pendulums or vibratable systems attached to a rigid structure is set in vibration or oscillation, the second system automatically begins to vibrate or oscillate by resonance. The characteristics of movement of the second system can be easily observed and analyzed or even recorded. Oscillating or vibrating systems, when under a predetermined state of movement, exert forces of reaction and inertia on their supports which may constitute stresses applied to a structure under test, said stresses being produced without outside intervention and independently of the systems themselves. The effect of the stresses just referred to is to produce displacements which are a function of the rigidity of the structure under test. It is the small displacements of the test structure following the variable states of movement of the oscillating or vibrating systems which conditions the periodic transfer of energy from one system to the other. In applying oscillating or vibrating systems to a test structure, a study is made, so to speak of the "interior" of the structure in question very much as in the photo-elastic method. The characteristics of movement so determined may be utilized by either the method of comparison or of calculation, for studying the rigidity, the firmness or the fatigue of a structure to be tested. The novel method may be applied during the course of construction or, where the fatigue is to be determined, at any desired time intervals during the use of the completed structure, the test structures being either permanently attached to, or detachable from the structure under test.

Referring to Fig. 1 of the drawing there is shown a vertical test structure A in the nature of a metallic pole rigidly fixed in the earth or in any suitable base. In proceeding to a test, a cross piece $b$ is fixed rigidly at the summit $a$ of pole A and two pendular masses $c^1$ and $c^2$ of identical mass are suspended therefrom. Pendulum $c^1$, which may be designated a motor-pendulum, when set in motion will automatically cause pendulum $c^2$, hereinafter to be designated the receiving pendulum, to oscillate by resonance. If the oscillations of the receiving pendulum be studied, it will be found that their amplitude gradually increases, passes through a maximum, and then gradually diminished toward zero. The total time of oscillation $t$, that is to say, the interval which separates two identical states in the movement of the receiving pendulum (for example, two stoppages of the system) may be easily measured. If K be used to designate the rigidity of the vertical pole under flexion, i. e., the ratio of the stress to the corresponding deflexion at a predetermined point, its value may be calculated by the following formula $$K = \frac{4\pi^2 M t}{T^3}$$

wherein M represents the mass of the receiving pendulum, T the time or period of one oscillation and $t$ the time during which oscillation occurs. The value of K is that given by the formula $$K = \frac{3EI}{l^3}$$

in which E is Young's modulus of the material which, in this case, may be assumed to be a cylindrical and homogeneous pole, $l$ the length of the latter and I the moment of inertia of its transverse section. The simple relation given above yielding the value of K applies only in the particular case indicated and when the ratio $$\frac{T}{t}$$

is small with relation to unity. It is not difficult, however, to determine the relation $K = f$ ($t$. M. T), this relation being different in each particular case while remaining, generally, simple.

Instead of proceeding by calculation, recourse may be had, evidently, to the method of comparison when the latter is practically possible.

The example illustrated in Fig. 2 differs from the one shown in Fig. 1 only in that the receiving pendulum $c^2$ is mounted on the post at a point other than $a$. The pendular masses may either be equal or different. The same principle is involved and the manner of calculating evident.

If it be desired to measure the rigidity of a beam, some such procedure as that shown in Fig. 3 may be made use of. As will appear from the drawing, a support $d$ is rigidly fastened to the middle of the beam and a pair of flexion pendulums $e^1$ and $e^2$ are suspended from a pair of lamellar springs $f^1$ and $f^2$, the latter being rigidly attached at one extremity to support $d$. By setting either one of the pendular masses in vertical movement, the other will automatically oscillate and its movement may be studied and applied in the same manner as that of the receiving pendulum represented in Fig. 1.

The test assembly shown in Fig. 4 differs from that shown in Fig. 3 only in that pendular masses $e^3$ and $e^4$ are suspended from springs attached to the beam at points symmetrical to its center. In this case the pendular masses may be identical or different.

Fig. 5 shows the invention applied to a frame structure C. Here gravity, flexion or torsion pendulums may be attached to any pair of horizontal elements of the frame or to any one. If desired special traverses $h^1$ and $h^2$ may be rigidly mounted on the frame and test pendular masses $i^1$ and $i^2$ may be suspended therefrom.

If it be desired to study the rigidity of a structure submitted to torsional stresses, recourse may be had to the form of assembly illustrated in Fig. 6. Assuming the test structure to be in the form of a post or pole such as element D, a metallic wire $j^1$ and torsion pendulum $k^1$ serving as a "motor" is suspended therefrom. A rigid frame $m$ is attached to test piece D and a receiving torsion pendulum $k^2$ is suspended therefrom by means of a wire $j^2$. When torsional stresses are exerted transversely on element D by submitting motor pendulum $k^1$ to a twist, receiving pendulum $k^2$ will respond and the rigidity of structure D may be calculated as in the preceding cases.

The invention presents the following advantages:

A. No exterior point of application is necessary for applying stresses to the test structure, since the stresses are all "interior";

B. Automatic amplification is obtained, the small deformations of the test structure being communicated to the oscillating or vibrating testing elements which themselves produce the stresses;

C. The rigidity measurements are obtained under the effect of stresses applied alternately in opposite directions, i. e., under conditions very close to those under which the structure operates.

The invention is not to be taken as limited to any of the particular structures of assemblies shown in any particular figure. Thus, the test method represented in Figs. 3 and 4 may be applied to structures of the type shown in Figs. 5 and 6 or conversely.

What I claim is:—

1. The method of inspecting the state of a structure which comprises, connecting to said structure two oscillatable elements adapted to move freely with simple harmonic motion, starting one of these elements into oscillation, whereby the second element acquires a sympathetic oscillation and both elements are caused to oscillate with periodically varying respective amplitudes, and measuring the period of the variation from minimum to maximum amplitude of the sympathetic element as an index of the characteristics of the structure.

2. The method of inspecting the state of a structure, which comprises, connecting to said structure two oscillatable elements adapted to move freely with simple harmonic motion, starting one of these elements into oscillation, whereby the second element acquires a sympathetic oscillation and both of these elements are caused to oscillate with periodically varying respective amplitudes, and measuring the number of oscillations of one of these elements that take place during one period of the variation from minimum to maximum amplitude of the sympathetic element as an index of the characteristics of the structure.

3. The method of inspecting the state of a structure which comprises connecting to said structure two pendulums adapted to oscillate freely, starting one of these pendulums into oscillation, whereby the second element acquires a sympathetic oscillation and both pendulums are caused to oscillate with periodically varying respective amplitudes, and measuring the time period of the variation from minimum to maximum amplitude of the sympathetic element as an index of the characteristics of the structure.

4. The method of inspecting the state of a structure which comprises connecting to said structure two pendulums adapted to oscillate freely, starting one of these pendulums into oscillation, whereby the second element acquires a sympathetic oscillation and both pendulums are caused to oscillate with periodically varying respective amplitudes, and measuring the number of oscillations of one of these pendulums that take place during one period of the variation from minimum to maximum amplitude of the sympathetic element as an index of the characteristics of the structure.

PAUL MARCEL LE ROLLAND.